United States Patent
Dinkel (10) Patent No.: US 12,546,948 B2
(45) Date of Patent: Feb. 10, 2026

(54) METHOD FOR ORIENTING AND TERMINATING POLARIZATION-MAINTAINING (PM) OPTICAL FIBER AND FORMING A PM OPTICAL FIBER ASSEMBLY

(71) Applicant: OpTek Systems, Inc., Greenville, SC (US)

(72) Inventor: Duane Dinkel, Simpsonville, SC (US)

(73) Assignee: OpTek Systems, Inc., Greenville, SC (US)

( * ) Notice: Subject to any disclaimer, the term of this patent is extended or adjusted under 35 U.S.C. 154(b) by 357 days.

(21) Appl. No.: 18/466,183

(22) Filed: Sep. 13, 2023

(65) Prior Publication Data
US 2024/0085644 A1    Mar. 14, 2024

Related U.S. Application Data (60) Provisional application No. 63/375,450, filed on Sep. 13, 2022.

(51) Int. Cl.
*G02B 6/38*    (2006.01)
*G02B 6/25*    (2006.01)
(Continued)

(52) U.S. Cl.
CPC ......... *G02B 6/3812* (2013.01); *G02B 6/2552* (2013.01); *G02B 6/3839* (2013.01);
(Continued)

(58) Field of Classification Search
CPC .. G02B 6/2552; G02B 6/3885; G02B 6/3861; G02B 6/3855; G02B 6/3812;
(Continued)

(56) References Cited

U.S. PATENT DOCUMENTS

| | | |
|---|---|---|
| 4,932,740 A | 6/1990 | Berkey et al. |
| 5,625,735 A | 4/1997 | Di Maggio et al. |

(Continued)

FOREIGN PATENT DOCUMENTS

| | | |
|---|---|---|
| CN | 101387723 A | 3/2009 |
| CN | 110456464 A | 11/2019 |

(Continued)

OTHER PUBLICATIONS

European Search Report for Application EP 23 19 7065 dated Feb. 5, 2024, 2 pages.

(Continued)

*Primary Examiner* — Michelle R Connelly
(74) *Attorney, Agent, or Firm* — Howard & Howard Attorneys PLLC (57) ABSTRACT

Methods of assembling polarization-maintaining (PM) optical fiber assemblies includes inserting optical fibers through channels of a receptacle with ends of extending past a front face of the receptacle. The first ends are radiated causing the initial fiber diameter to expand and results in an enlarged fiber diameter and forms an enlarged portion for a desired length along the PM optical fibers. The birefringent elements of the optical fibers are aligned to present a desired orientation and the optical fibers are further retracted until the enlarged portions abut the corresponding channels to mechanically lock the orientation of the optical fibers. The optical fiber assembly is further finished to maintain the polarity from the first end to a second end.

19 Claims, 8 Drawing Sheets

(51) Int. Cl.
*G02B 6/255* (2006.01)
*G02B 6/40* (2006.01)
*G02B 6/44* (2006.01)

(52) U.S. Cl.
CPC ......... *G02B 6/3855* (2013.01); *G02B 6/3885* (2013.01); *G02B 6/25* (2013.01); *G02B 6/3861* (2013.01); *G02B 6/406* (2013.01); *G02B 6/448* (2013.01)

(58) Field of Classification Search
CPC .. G02B 6/3834; G02B 6/3839; G02B 6/3843; G02B 6/448; G02B 6/25; G02B 6/406; G02B 6/3881
See application file for complete search history.

(56) References Cited

U.S. PATENT DOCUMENTS

| | | | |
|---|---|---|---|
| 5,926,594 A | 7/1999 | Song et al. | |
| 6,744,939 B2 | 6/2004 | Lampert et al. | |
| 6,870,628 B2 | 3/2005 | Healy et al. | |
| 7,252,130 B2 | 8/2007 | Nonomura et al. | |
| 7,445,832 B2* | 11/2008 | Matsumoto | G02B 6/3885 385/115 |
| 7,577,330 B2 | 8/2009 | Beshears et al. | |
| 8,132,971 B2 | 3/2012 | Luther et al. | |
| 8,457,461 B2 | 6/2013 | Ott | |
| 8,740,474 B2 | 6/2014 | Lu | |
| 9,069,144 B2 | 6/2015 | Bradley et al. | |
| 9,568,685 B2* | 2/2017 | Bradley | G02B 6/3851 |
| 9,885,843 B2 | 2/2018 | Bhagavatula et al. | |
| 10,330,875 B2 | 6/2019 | Fini et al. | |
| 10,401,568 B2 | 9/2019 | Lu | |
| 10,739,169 B2 | 8/2020 | Pacini et al. | |
| 10,788,627 B2 | 9/2020 | Bhagavatula et al. | |
| 10,838,140 B2 | 11/2020 | Li et al. | |
| 10,845,555 B2 | 11/2020 | Fini et al. | |
| 11,256,039 B2 | 2/2022 | Carberry et al. | |
| 2002/0126961 A1 | 9/2002 | Hirabayashi et al. | |
| 2002/0129623 A1* | 9/2002 | Nonomura | G02B 6/3843 385/100 |
| 2005/0129371 A1 | 6/2005 | Massey | |
| 2010/0080511 A1 | 4/2010 | Luther et al. | |
| 2011/0097048 A1 | 4/2011 | Olsen | |
| 2012/0045169 A1 | 2/2012 | Hu et al. | |
| 2016/0033720 A1 | 2/2016 | DiGiovanni | |
| 2016/0062040 A1* | 3/2016 | Hodge | G02B 6/3855 65/378 |
| 2021/0286140 A1 | 9/2021 | Winzer | |
| 2021/0294044 A1* | 9/2021 | Haag | G02B 6/2555 |
| 2022/0004566 A1 | 1/2022 | Lu et al. | |
| 2022/0350080 A1 | 11/2022 | Lawson et al. | |

FOREIGN PATENT DOCUMENTS

| | | |
|---|---|---|
| EP | 0778957 B1 | 11/2001 |
| JP | H04110806 A | 4/1992 |
| JP | 2013171208 A | 9/2013 |
| WO | 2002101439 A1 | 12/2002 |

OTHER PUBLICATIONS

English language abstract for JPH 04-110806 A extracted from espacenet.com database on Feb. 14, 2024, 1 page.
English language abstract for CN 101387723 A extracted from espacenet.com database on Sep. 14, 2023, 1 page.
English language abstract for CN 110456464 A extracted from espacenet.com database on Sep. 14, 2023, 1 page.
English language abstract for JP 2013-171208 A extracted from espacenet.com database on Sep. 14, 2023, 1 page.

* cited by examiner

METHOD FOR ORIENTING AND TERMINATING POLARIZATION-MAINTAINING (PM) OPTICAL FIBER AND FORMING A PM OPTICAL FIBER ASSEMBLY

BACKGROUND OF THE INVENTION

1. Field of the Invention

The subject invention relates to a method for orienting and aligning the birefringent elements of a single or plurality of polarization-maintaining (PM) optical fiber(s) for deployment in optical connectors, optical fanouts, flexible circuits, fiber array units, waveguides, and ribbonized fiber.

2. Description of the Related Art

Utilization of optical fibers ultimately require termini for joining fiber segments at their ends, or for connecting optical fibers to active or passive devices. In joining fiber ends, the primary function of the termini is maintaining the ends in a butting relationship such that a core of one of the fibers is axially aligned with a core of the other fiber, or in the case of terminating to an active device or waveguide, axially aligning mode field diameters. This alignment maximizes light transmissions from one fiber to the other and/or reduces insertion loss therebetween. Another goal is to minimize back reflections. Alignment of these small diameter fibers is extremely difficult to achieve. The mode field diameter (MFD) of a single-mode optical fiber is approximately nine (9) microns (0.009 mm). The MFD is slightly larger than the core diameter. Good alignment (low insertion loss) of the fiber ends is a function of the transverse offset, angular alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects.

Polarization maintaining optical fibers (PMF) are a specialty singlemode optical fiber that linearly propagates polarized light by controlling the birefringence within the core. The birefringence is controlled by highly doped birefringent elements that surround the core of the optical fiber, allowing preservation of orthogonal polarization planes, often referred to by the plane's relative axes against a reference position (Fast or Slow; Horizontal or Vertical), throughout a finite length of fiber. These birefringent elements can take the form of stress-applying structures, such as stress members, elliptical cores, bow-tie shapes, or stress rods introduced near or within the core. The exact design depends on the specific requirements of the application of the optical fiber. Referring to stress rods, as the optical fiber is drawn, the stress rods are accordingly diminished in diameter and are located within the cladding, preferably on either side of the core. The stress rods have different thermal expansion characteristics than the surrounding glass, and the stress they exert on the core causes the index of refraction to change along that axis. The axes then have different indices of refraction value and thus propagate light at different speeds. Similar stress-induced drawing techniques are also found in Bow-tie and elliptical cores. While there are many varieties and manufacturers of PMF, commercial availability is dominated by PANDA, Bow-tie, and elliptical-stress fibers. Natural changes in polarization state, such as radial stresses and bends in the fiber, do not occur in PMF due to the dominating presence of the birefringent elements. PMF has historically been relegated to telecommunications, specifically in pump laser designs and modulation, and fiber optic gyroscopes used in various guidance applications. Recent advances in high-speed telecommunications, specifically silicon photonics, on-board optics, and co-packaged optics, as well as biomedical, optical sensing, quantum computing, and other industrial applications have heightened the adoption of PMF.

Preserving the polarization state of PMF for end-to-end applications has historically required manual rotational alignment of the optical fiber such that birefringent elements match the application's intended polarity (vertical/horizontal, fast/slow) at the interface—interface to another optical fiber or waveguide or active device (laser diode source, detector, silicon chip, etc.). The quality of the birefringent element orientation is measured in degrees (i.e., ±3°) or by extinction ratio, which compares optical power in the desired polarization axis to that of the unwanted, orthogonal polarization state (measured in dB). Manual alignment of a single fiber, though tedious and time-consuming, represents the majority of today's method of manufacturing. In applications requiring multiple PMF, such as fiber array units, multi-fiber connectivity (MTP, MPO), silicon chips, and multi-channel waveguides, aligning multiple PMFs is extremely challenging—properly aligning one fiber, then disrupting the alignment of the one fiber during the alignment of a second fiber, etc. These manufacturing challenges are proving disruptive to next-generation architectures.

PM optical fiber has polarization-dependent refractive indices, and the speed of light in an optical fiber is inversely proportional to the magnitude of the refractive index. A PM optical fiber is one having two polarizations with different velocities of propagation, thus giving rise to a "fast" wave and a "slow" wave, which can be caused by any different types of birefringent elements, such as stress rods or stress members, that includes well known configurations of panda, bow tie, elliptical clad and elliptical core, as described above. In a PM optical fiber, the polarization of a linearly polarized light wave input to the fiber, with the direction of polarization parallel to that of the one of the two principal polarizations, will remain or be maintained in that polarization as it propagates along the fiber, hence the term "polarization maintaining." If the polarization of the light wave is to be maintained at a splice or other connection, the principal axes of birefringence of the two joined fibers must be aligned in parallel, otherwise there will be polarization cross-coupling, i.e., crosstalk, which is highly undesirable.

The current connectable optics are expected to be limited in their ability to support capacities of 1.6 Tb/s, 3.2 Tb/s, and higher in terms of the required electrical and optical densities, thermal issues, and power consumption. As a result of discrete electrical device implementation, power dissipation and thermal management are becoming limiting factors for future connectable optics. Therefore, the industry is turning to co-packaged optics (CPO) to achieve higher bandwidth and energy efficiency.

BRIEF SUMMARY OF THE INVENTION

The subject invention provides a method of orienting birefringent elements of polarization-maintaining (PM) optical fiber for a single or plurality of optical fiber assemblies.

One general aspect includes manufacturing an optical fiber assembly having one or more polarization-maintaining optical fibers The method also includes inserting each of the first ends of the optical fibers through respective bores of a first receptacle, the bores having a bore diameter larger than an initial fiber diameter, so that the first ends of the optical fiber extend a distance beyond a front face of the receptacle. Next, the method includes simultaneously radiating a portion of the first ends of each the optical fibers that extend from the front face with a high energy source to expand the portion and form an expanded tip having an expanded diameter larger than the bore diameter of the receptacle. After the expanded tip is formed, one of the optical fibers is rotated to achieve a desired orientation of the birefringent elements (fast or slow axis) and retracted towards the front face to cause the expanded tip to interfere with and engage the respective bore for holding the optical fiber in the desired orientation. The method also includes continuing to rotate and retract the remaining optical fibers one at a time until all of the optical fibers have the desired orientation and are held in the respective bore.

Once the single or plurality of fibers are properly PM aligned and seated within the receptacle, the birefringent elements will maintain that alignment throughout the remaining length of optical fiber, at least as long as the beat length, which is described as the periodic distance over which the phase difference increases to an amount equal to $2\pi$. With the birefringent elements aligned and seated in the receptacle, the opposing ends of the single or plurality of fibers can then be processed with like alignment, resting in Fiber Array Units (v-groove arrays) or waveguides, terminated into single or multi-fiber assemblies such as MTP or MPO, processed into flexible circuits, or coated with acrylate materials to form ribbonized fibers, or terminated against an active device such as a laser diode, detector, or silicon photonic chip. The receptacle used to originally align the birefringent elements can either be secured with epoxy and polished to a final product or removed as a sacrificial component.

Another general aspect includes manufacturing an optical fiber assembly having one or more polarization-maintaining optical fibers having a core by inserting the first end of the optical fiber through a bore of a receptacle, the bore having a bore diameter larger than an initial fiber diameter and extending the first end of the optical fiber a distance beyond a front face of the receptacle. Then, a portion of the first end of the optical fiber that extends from the front face is radiated with a first high energy source to expand the portion and form an expanded tip having an expanded diameter larger than the bore diameter of the bore. The method also includes determining an orientation of the birefringent elements of the optical fiber and rotating the optical fiber to achieve a desired orientation of the birefringent elements. Next, the optical fiber is retracted towards the front face to cause the expanded tip to interfere with and engage the bore for holding the optical fiber with the desired orientation of the birefringent elements in the receptacle. The method also includes radiating the expanded tip with a second high energy source to cleave the expanded tip extending from the front face of the receptacle.

Yet another general aspect include a method of manufacturing an optical fiber assembly having one or more polarization-maintaining optical fibers with each optical fiber having a core, a cladding surrounding the core, and a plurality of birefringent elements disposed within the cladding. Each optical fiber has an initial fiber diameter and extends between a first end and a second end. Each of the first ends of the optical fibers are inserted through respective bores of a receptacle, the bores having a bore diameter larger than the initial fiber diameter. The first ends extend a distance beyond a front face of the receptacle. A portion of the first ends of each the optical fibers that extend from the front face are simultaneously radiated with a high energy source to expand the portion and form an expanded tip having an expanded diameter larger than the bore diameter of the bores. One of the optical fibers are rotated to achieve a desired orientation of the birefringent elements and retracted towards the front face to cause the expanded tip to interfere with and engage the respective bore for holding the optical fiber in the desired orientation. The method includes continuing to rotate and retract the remaining optical fibers one at a time until all of the optical fibers have the desired orientation and are held in the respective bore. Then, the second ends of the optical fibers are terminated in a second connector such that end-to-end polarization across the plurality of optical fibers is preserved. Finally, the receptable is removed from the first end and each of first ends of the optical fiber may be connectorized.

The subject invention offers the ability to align the plurality of optical fibers in the same orientation state, such as all fast, all slow axes. Further, the subject invention offers the ability to selectively align the plurality of optical fibers in unique orientation states, such as one fast, or one slow. Alternatively, the subject invention offers the ability to selectively align the polarization states to that of the active device, which may be somewhere between fast and slow, thus allowing maximum Polarization Extinction Ratio (PER) to the given active device. The PM optical fiber assembly may be identified as a jumper, which consists of a single or plurality of optical fibers with like or unlike connectors on either end of the assembly. Alternatively, the PM optical fiber assembly may be identified as a pigtail, which consists of a single or plurality of optical fibers with a single connector on one end and either bare fibers, perhaps cleaved or lensed, or arrayed, perhaps in v-grooves or ribbon, on an opposite end of assembly. In consideration of a plurality of PM fibers, the individual fibers represent a channel, transmitting a specific wavelength, power level, modulated signal from or to source laser, detector, modulator, MUX/DEMUX, or other active element. The termini for a plurality of PM fibers may be a multi-fiber optical connector, a v-groove array, or left bare with flat cleaves, angle cleaves, or lensed. The subject invention also provides for precise and efficient orienting and terminating in a manner that was previously not possible.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figures 1, 2A, 2B:
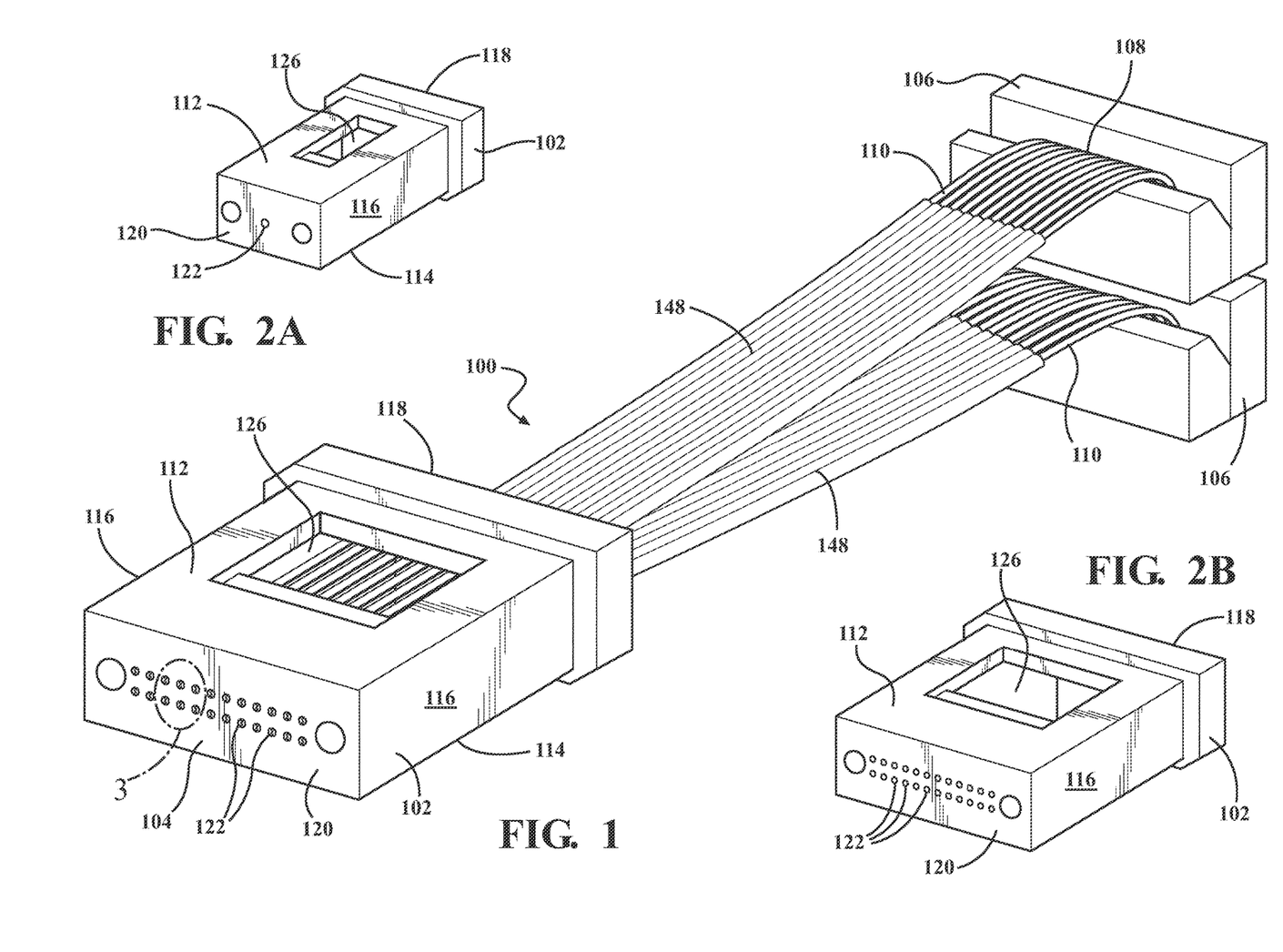
FIG. 1 is a perspective of a connector or ferrule, such as a multi-fiber push on (MPO) connector on one end and pair of v-groove connectors on the other end.
FIG. 2A is a perspective view of a single optical fiber connector.
FIG. 2B is a perspective view of an MPO optical fiber connector.

Referring to the Figures, wherein like numerals indicate like parts throughout the several views, a polarization-maintaining (PM) optical fiber assembly 100 and method of forming the same is shown. Referring to FIG. 1, the assembly 100 includes a first receptacle 102, shown as a multi-fiber push on (MPO), on a first end 104 and a pair of second connectors 106, shown as V-groove connectors, on a second end 108. In certain embodiments, the first receptacle 102 may be a connector for an optical connectors, optical fanouts, flexible circuits, fiber array units, and ribbonized fiber and is not limited to a MPO connector. Additionally, the first receptable 102 may be temporary on the first end 104 and may be removed for forming the completed optical fiber assembly 100. A plurality of PM optical fibers 110 extends from the first receptacle 102 and the second connectors 106. One common type of MPO connector is a MTP connector. It is to be appreciated that the subject invention can be used with any type of precision bored receptacle and is not limited to any particular type of connector. The receptacle 102 shown in FIG. 2A is a single MPT connector and the receptacle 102 shown in FIG. 2B is a 2×12 MTP connector that would receive 24 optical fibers 110. Generally, the receptacle 102 has a top 112, a bottom 114, sides 116 and an open end 118 and a front face 120. Referring to the first receptacle 102, a plurality of bores 122, or channels, extend between the open end 118 and the front face 120 and each bore 122 defines a bore diameter 124. Preferably, the bores 122 are precision bores. Connectors are typically a single row or a double row of optical fibers 110 and typically provide for 4, 8, 10, 12, 16, or 24 optical fibers 110 for connection. In certain embodiments, the receptable 102 may be sacrificial and a temporary component used in forming the optical fiber assembly 100. The top 112 of the receptacle 102 has an opening 126 for receiving adhesive or compounding material as is known to those skilled in the art for securing the optical fibers 110 therein when the receptable 102 forms a component of the optical fiber assembly 100.

Figure 3:
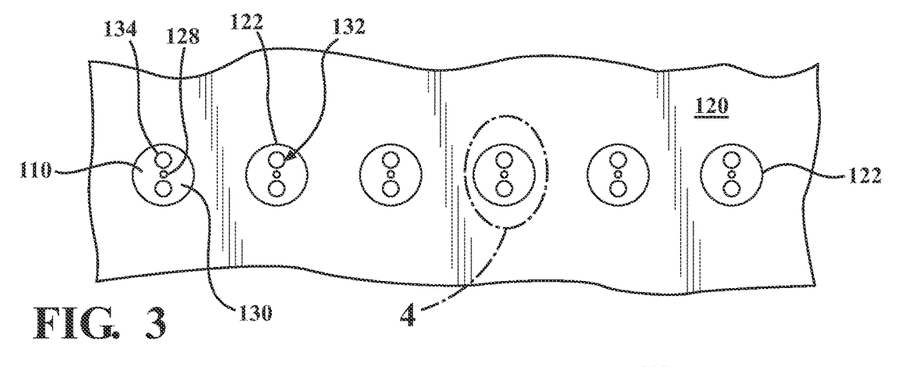
FIG. 3 is a close-up view of a front face of the connector having first ends of the PM optical fibers having a desired orientation.
Figure 4:
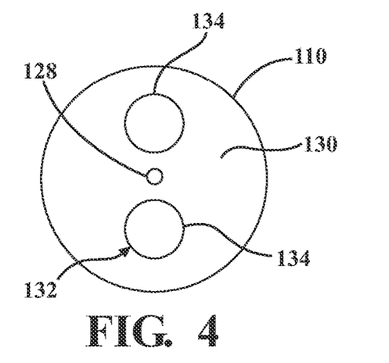
FIG. 4 is a close-up view of a first end of the PM optical fibers.
Figure 5:
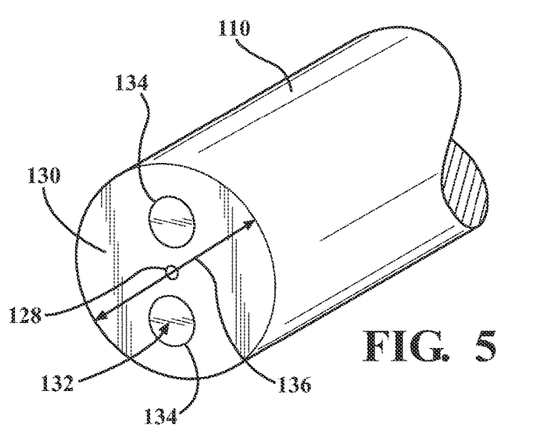
FIG. 5 is a perspective view of the PM optical fiber.

Referring to FIGS. 3-5, each of the PM optical fibers 110 include a core 128, a cladding 130 surrounding the core 128, a pair of birefringent elements, shown generally at 132, such as stress rods 134, disposed adjacent the core 128 and in the cladding 130 for creating a stress within the core 128. The birefringent elements 132 may also be other stress members other than stress rods 134, such as bow ties, elliptical core or clads, and the like that are well known to those skilled in PM fiber arts. FIG. 5 shows a perspective, close-up end view of the PM optical fiber 110 having the stress rods 134 adjacent the core 128. The stress rods 134 are typically formed from a boron material. Each of the PM optical fibers 110 extends between the first end 104 and the second end 108 and each has an initial fiber diameter 136. Preferably, the initial fiber diameter 136 is constant between the first end 104 and the second, or terminal, end 108. However, various applications may utilize PM optical fiber 110 that has varying diameter without departing from the scope of the subject invention. The initial fiber diameter 136 of the optical fibers 110 is less than the bore diameter 124 to allow the PM optical fiber 110 to pass therethrough. Typically, the initial fiber diameter 136 may be from 50 to 150 µm. Another common initial fiber diameter 136 that may be used with the subject invention is 125 µm.

Figure 6:
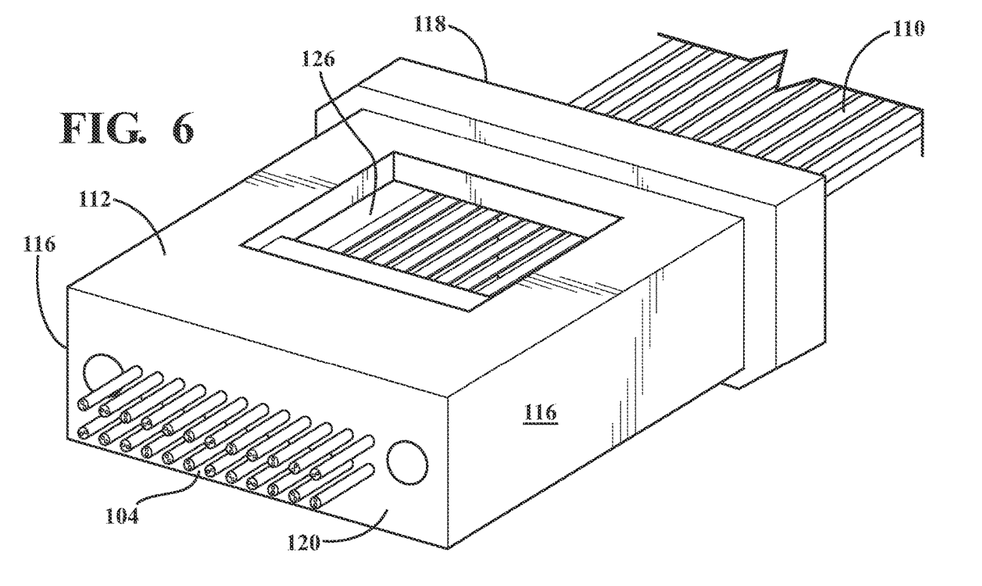
FIG. 6 is a perspective view of the MPO connector having the first ends of the optical fibers extending beyond the face and having a random orientation.

Referring to FIG. 6, the plurality of PM optical fibers 110 has been inserted through the bores 122 of the receptacle 102 such that a portion of the first ends 104 of the respective PM optical fibers 110 extend past the front face 120 of the receptacle 102. The first ends 104 are shown in FIG. 6 having the stress rods 134 in a random orientation. In one embodiment, the first ends 104 extend about 1-3 mm from the front face 120. Preferably, the first ends 104 extend about 1 mm.

Figure 7:
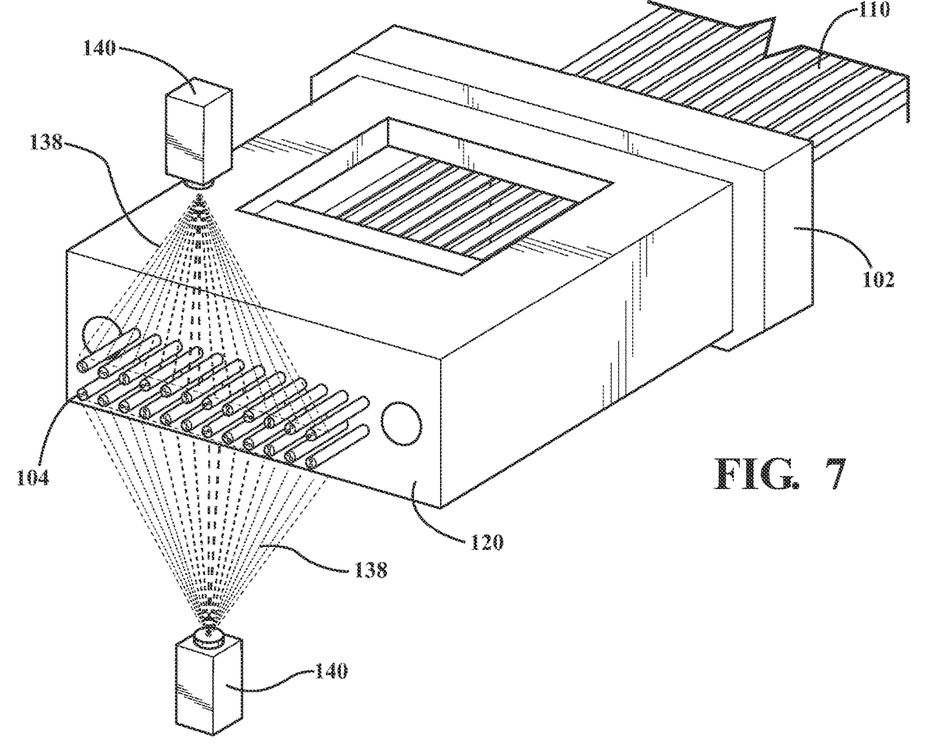
FIG. 7 is a perspective view of laser sources cleaving and enlarging the first ends of the optical fibers causing the first ends to flare and increase in diameter resulting in an expanded tip.
Figure 8:
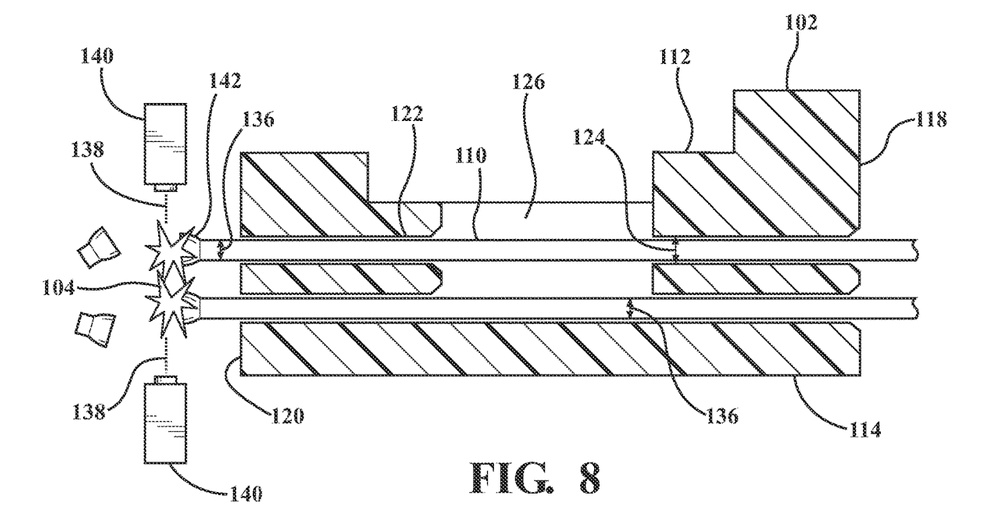
FIG. 8 is a cross-sectional view of the laser sources cleaving and enlarging the first ends of the optical fibers.

Next, the portion of the first end 104 of the PM optical fibers 110 that extend from the front face 120 are radiated causing the initial fiber diameter 136 to expand, as shown in FIGS. 7-8. In one embodiment, a laser beam 138 is used to radiate the first ends 104, such as a highly thermalized laser beam 138, preferably a carbon dioxide laser beam 138, which causes the tip to intentionally flare. The laser beam 138 is emitted from a laser source 140. The laser source 140 may emit a carbon dioxide laser beam 138 with the wavelength of 10.6 µm. The laser source 140 is positioned perpendicular or orthogonal to the optical fiber 110. It is to be appreciated that other types of laser sources 140 having different types of beam shapes and different wavelengths may be used with the subject invention. The laser beam 138 may include a width that spans a single optical fiber 110 or all of the optical fibers 110 in a single pass. There may also be multiple laser sources 140 if there are two rows of optical fibers 110. Referring to FIG. 7, two laser sources 140 are shown emitting a wide beam toward the first ends 104. Alternatively, the laser source 140 may be positioned above the top row and then below the bottom row, or the laser source 140 may sequentially radiate both of the rows. For example, the laser source 140 may be quantum cascade laser, CO2, UV-excimer laser, semiconductor laser, or the like, and which may emit a laser beam 138 with a wavelength between 0.2 and 11 µm. One example to achieve the highly thermalized energy is to utilize a slow pulsed laser having a beam that is 1 mm wide and 200 µm long.

Exposing the first ends 104 to the highly thermalized laser beam 138 results in an expanded tip 142 having an expanded fiber diameter that is larger than the bore diameter 124 at the first end 104 and forming an expanded portion 142 for a desired length along the PM optical fibers 110, as best shown in the cross-sectional view of FIG. 8. The expanded tip 142 is shown while the excess is trimmed off. In certain embodiments, the excess may not be trimmed off and only the expanded portion 142 is formed. The carbon dioxide laser beam 138 can also be used to cleave the first end 104 of the PM optical fiber 110 at the same time as the end of the optical fiber 110 is enlarged. By simultaneously cleaving and expanding the first end 104 with the laser beam 138, the stress rods 134 become visible. It is to be appreciated that the cleaving and the expanding may be carried out as separate steps without deviating from the subject invention.

Figure 9:
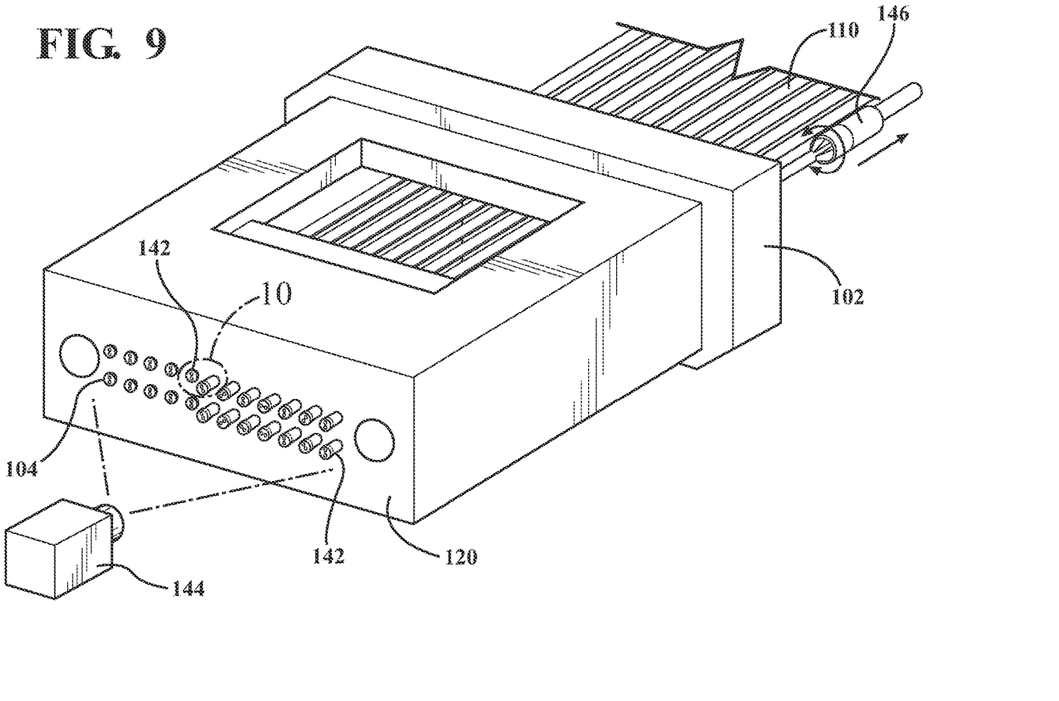
FIG. 9 is a perspective view of orienting and retracting the enlarged tips into the bores of the connector.
Figure 10:
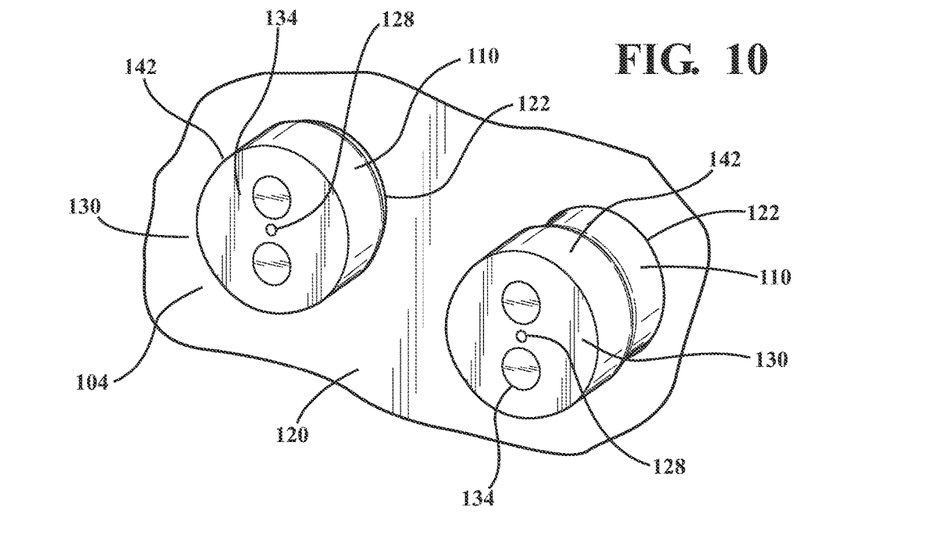
FIG. 10 is a perspective, close-up view of the enlarged tips.

FIGS. 9 and 10 are close-up views of the optical fibers 110 having been cleaved and having the expanded portion 142. It is to be appreciated that the expanded portion 142 may only be 1-5 µm larger than the initial fiber diameter 136. As one example, if the initial fiber diameter 136 is 125 µm and the bore diameter 124 is 126 µm, an increase of 1-5 µm in the expanded portion 142 would be larger than the bore diameter 124. It is to be appreciated that expanded portion 142 has to be large enough to create a friction fit or mechanical interference.

In the embodiment with a single optical fiber 110, the orientation of the stress rods 134 are determined and then aligned to present a desired orientation. In the embodiment with a plurality of optical fibers 110, as shown in FIG. 9, each of the optical fibers 110 are aligned and oriented based on the desired orientation of the stress rods 134. For example, the stress rods 134 may be optically aligned under magnification visually or using a polarization extinction ratio (PER) meter 144. If the orientation is performed visually, the first end 104 of the optical fiber 110 is under magnification to see the orientation of the stress rods 134 and the optical fiber 110 is rotated to within 5 degrees of the desired orientation. The rotation may be performed using a digital rotation stage 146.

Alternatively, the orientation may be performed by transmitting a light through the optical fiber 110 and measuring a polarization extinction ratio of the light with the PER meter 144. The polarization extinction ratio is communicated from the PER meter 144 to the digital rotation stage 146 to continue to rotate the optical fiber 110 about the optical fibers 110 longitudinal center until the maximum polarization extinction ratio is achieved. The alignment and orientation of the individual optical fibers 110 may vary based on application and end use; however, the subject invention allows for the precise alignment and orientation that can be tailored to such end uses. FIG. 10 is a close-up view showing that the stress rods 134 have been aligned to a desired orientation. Once the orientation is achieved, the optical fibers 110 are further retracted to mechanically lock the orientation into the bore 122.

After the PM optical fiber 110 is enlarged and oriented, it is retracted through the corresponding bore 122 until the expanded portion 142 abuts the corresponding bore 122 at the front face 120 of the receptacle 102. The optical fiber 110 is retracted to mechanically lock the orientation of the optical fiber 110 into the bore 122. The retraction may be performed manually or via translation stages until seated in the bore 122.

Figure 11:
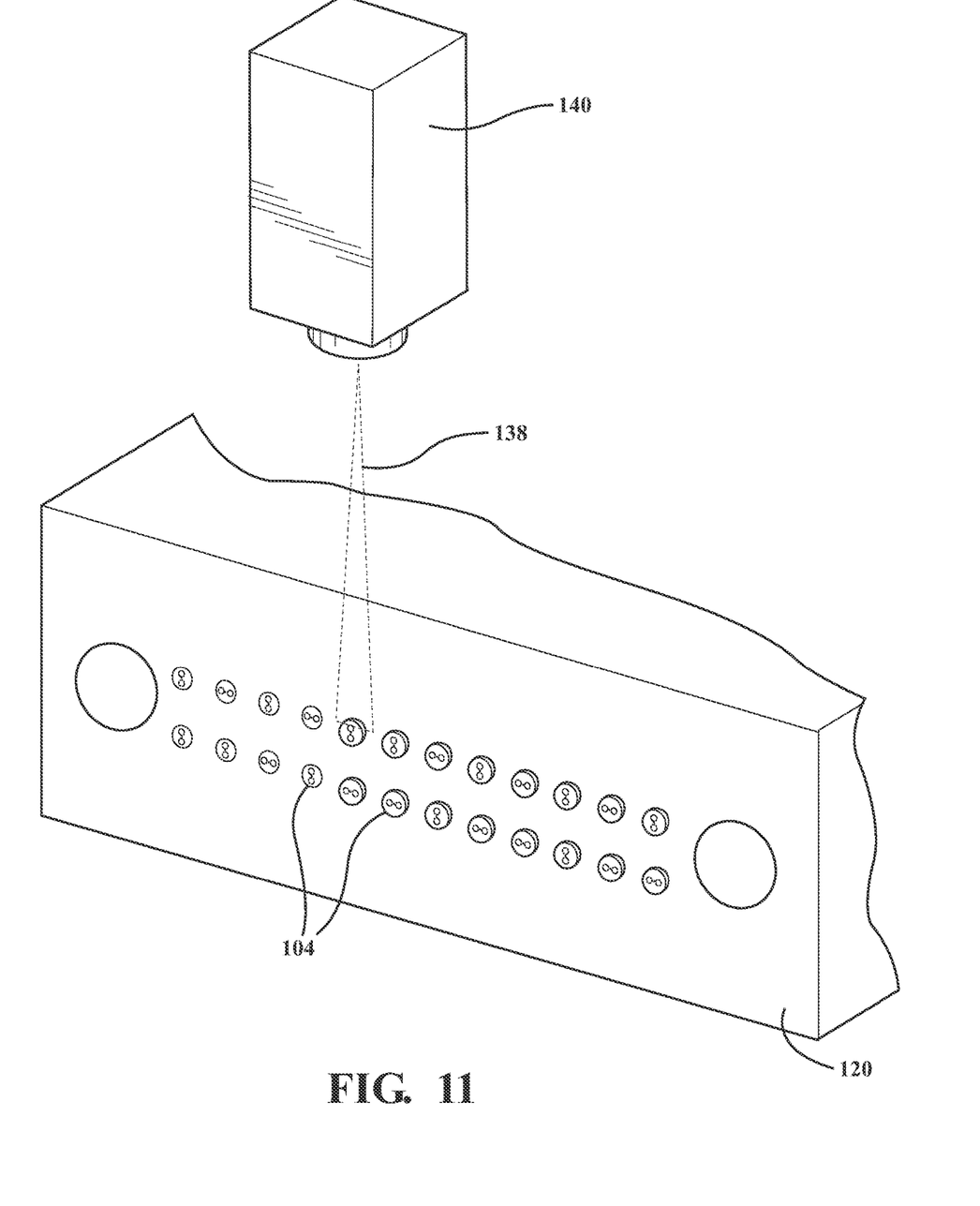
FIG. 11 is a perspective, close-up view of first ends of the PM optical fibers shown in FIG. 8 being aligned and mechanically locked and having the first ends of the optical fibers finished.

Referring to FIG. 11, in embodiments with the plurality of optical fibers 110, after the first optical fiber 110 has been oriented and retracted, the second optical fiber 110 is then oriented to its desired polarization state and then retracted through the corresponding bore 122 until the enlarged portion 142 abuts the corresponding second channel at the front face 120 of the receptacle 102. It is to be appreciated that the subject invention may orient and retract multiple optical fibers 110 simultaneously by incorporating additional meters and rotation and translation stages to perform such steps. FIG. 11 is a perspective view of the MPO connector having the optical fibers 110 retracted into the bores 122. As discussed above, retracting the optical fiber 110 causes a friction fit between the expanded portion 142 and the bore diameter 124.

In one embodiment, once the stress rods 134 of the optical fibers 110 are aligned to present the desired orientation and retracted, the first ends 104 of the optical fibers 110 are finished to terminate the optical fibers 110 within the receptacle 102, such as in the case of the MPO connector. FIG. 11 illustrates some of the first ends 104 having been finished. It is to be appreciated that the laser source 140 may utilize a wide beam with a width to finish all the first ends 104 simultaneously, or a narrow beam to finish individual first ends 140. Alternatively, the finishing step may include polishing with finishing film down to Telcordia specifications. Additional finishing steps may be used with the subject invention with departing therefrom. In one embodiment, the finishing step may be performed using CO2 laser beam 138. As discussed above in connection with expanding the optical fiber 110, the same laser source 140 may be used to terminate the optical fibers 110, and a singular or multiple laser sources 140 may be used.

The subject invention may further include the step bonding the optical fiber 110 into the bore 122 of the receptacle 102. In order to bond the optical fiber 110 into the bore 122, an adhesive may be deposited within the bore 122, the receptacle 102, or both to secure the optical fiber 110 to the receptacle 102. Typically, the adhesive is disposed through the opening 126 in the receptacle 102 to further secure the optical fibers 110 into the receptacle 102. Then, the adhesive is cured after the expanded portion 142 has been cleaved. Various, well known bonding adhesive may be use and the associated methods may be used to cure the adhesive. For example, the adhesive may be a UV-curing or heat-curing epoxy. For example, the finishing step may be performed using CO2 laser beam 138 to simultaneously finish the end and further bond the optical fibers 110 into the bores 122 of the receptacle 102.

With reference back to FIG. 1, the subject invention may also include the step of ribbonizing the optical fiber 110 that extends from the first end 104 of the receptacle 102 towards the first end 104 of the optical fiber 110 to form a ribbon fiber. The entire length from the receptacle 102 to the first end 104 of the optical fiber 110 can be ribbonized or a shorter length may be ribbonized depending on the particular application. Typically, up to 24 fibers can be grouped together. The individual fibers are aligned longitudinally, or placed side by side, to form a flat ribbon 148. It is to be appreciated that the ribbon fiber may have fewer or more layers of material surrounding the cores 128 depending upon the particular application. The subject application is particularly useful in co-packaged optic applications because the length of the optical fibers 110 is fairly short, less than 150 mm, and more likely less than 100 mm. Due to the short length, once the stress rods 134 are aligned and oriented at the first end 104 in the receptacle 102, the orientation remains the same the first end 104 of the optical fiber 110.

Figure 12A:
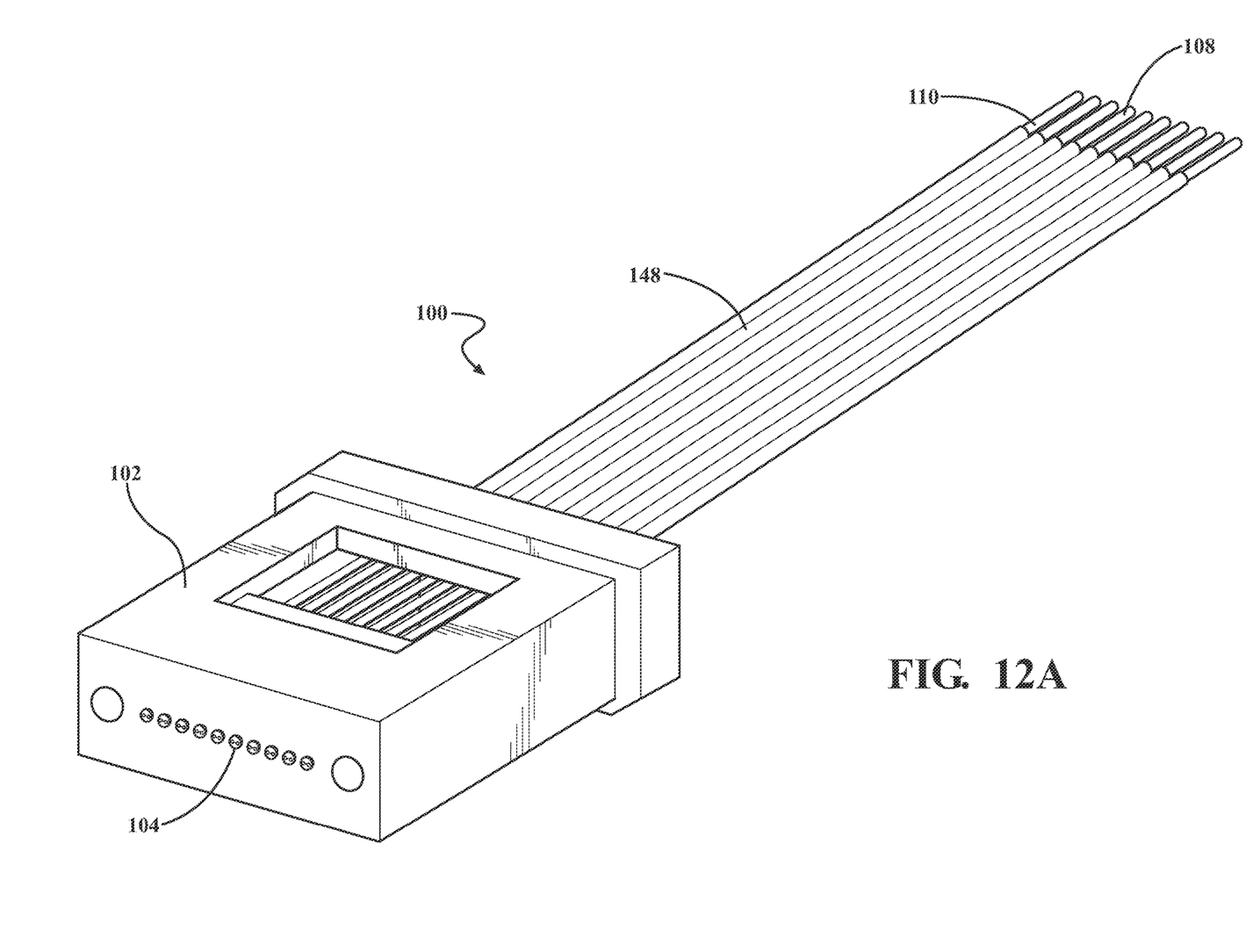
FIGS. 12A and 12B illustrate one embodiment of an optical fiber assembly.
Figure 12B:
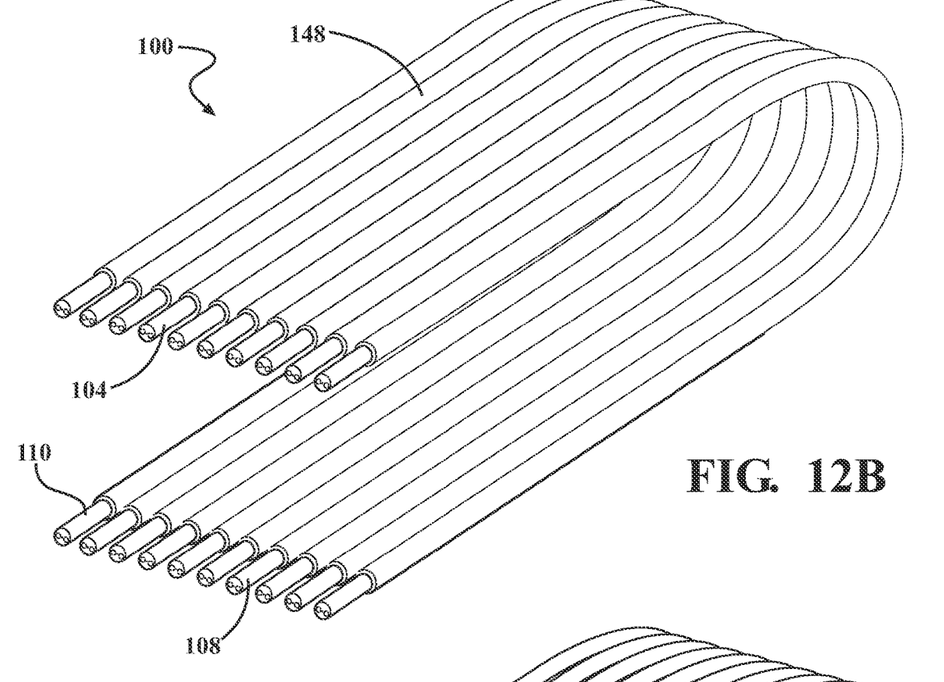

Referring to FIG. 12A, another embodiment is shown having the first ends 104 of the optical fiber 110 that have been oriented and retracted into the receptacle 102. Next, the portion of the optical fibers 110 extending from the open end 118 have been ribbonized. By ribbonizing the optical fibers 110 while the orientation is set by the interference fit in the bores 122, the orientation of the birefringent elements 132 is also maintained at the second end 108. The ribbonized cable may be formed by applying acrylate or polyimide coatings to the optical fibers 110. Then, the receptacle 102 can be removed from the first end 104. FIG. 12B show the optical fiber assembly 100 with the receptable 102 removed from the first end 104. The first ends 104 may then be further connectorized, if needed, while the end-to-end polarization is maintained.

Figure 13A:
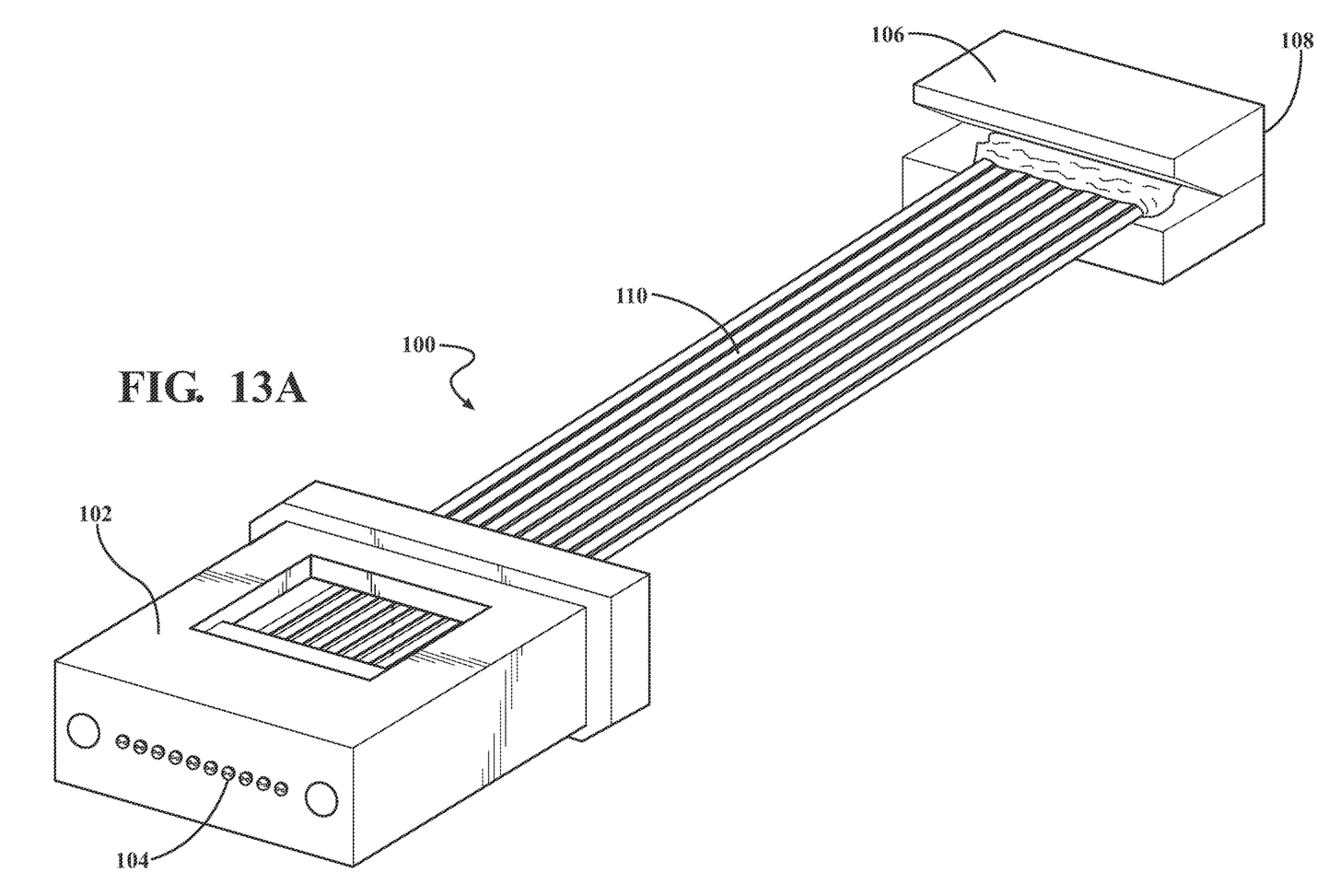
FIGS. 13A and 13B illustrate another embodiment of an optical fiber assembly.
Figure 13B:
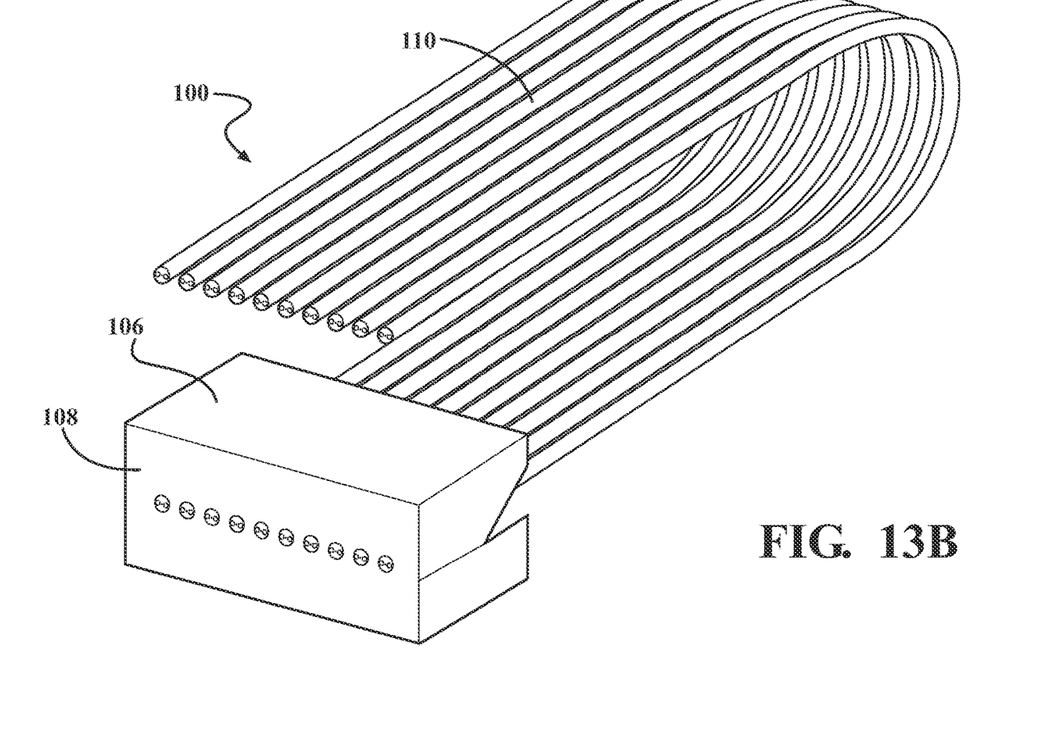

Another embodiment is shown in FIG. 13A having the first ends 104 of the optical fiber 110 that have been oriented and retracted into the receptacle 102. Next, the second ends 108 of the optical fibers 110 have been inserted into the second connector 106 and secured therein. By securing the second ends 108 into the second connector 106 while the orientation is set by the interference fit between the first ends 104 in the bores 122, the orientation of the birefringent elements 132 is also maintained at the second end 108. Then, the receptacle 102 can be removed from the first end 104. FIG. 13B show the optical fiber assembly 100 with the receptable 102 removed from the first end 104. The first ends 104 may then be further connectorized, if needed, while the end-to-end polarization is maintained.

In addition to the embodiments shown in FIGS. 1, 12A, and 13A, the second end 108 may be processed into in a single or multi-fiber connector such as a MTP or MPO or into a waveguide for active device termination, such as a laser diode, detector, or silicon chip. Alternatively, the remaining length of optical fiber 110 may be processed into a flexible circuit.

The subject invention allows for laser cleaving under highly thermalized beam parameters to induce fiber tip flare as in the expanded portion 142. The subject invention further allows for stress rod orientation, fast, slow, intermediate orientations; and retraction into the receptacle 102 or bore 122. Another advantage is that the subject invention may utilize beam to spot cure and set PM fibers into matrix of avalanching epoxy system. Yet another advantage is that the connectors 102 formed with the subject invention have reduced polishing and provides for a single finishing film versus traditional 6-step polishing sequences.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of manufacturing an optical fiber assembly having one or more polarization-maintaining optical fibers having a core, a cladding surrounding the core, and birefringent elements embedded within the cladding, the optical fiber having an initial fiber diameter and extending between a first end and a second end, said method comprising the steps of:
    inserting the first end of the optical fiber through a bore of a receptacle, the bore having a bore diameter larger than the initial fiber diameter;
    extending the first end of the optical fiber a distance beyond a front face of the receptacle;
    radiating a portion of the first end of the optical fiber that extends from the front face with a first high energy source to expand the portion and form an expanded tip having an expanded diameter larger than the bore diameter of the bore;
    determining an orientation of the birefringent elements of the optical fiber;
    rotating the optical fiber to achieve a desired orientation of the birefringent elements;
    retracting the optical fiber towards the front face to cause the expanded tip to interfere with and engage the bore for holding the optical fiber with the desired orientation of the birefringent elements in the receptacle; and
    radiating the expanded tip with a second high energy source to cleave the expanded tip extending from the front face of the receptacle.

2. A method as set forth in claim 1, wherein the step of determining an orientation of the birefringent elements is further defined as transmitting a light through the optical fiber and measuring a polarization extinction ratio of the light with a polarization extinction ratio meter.

3. A method as set forth in claim 2, further comprising the step of continuing to rotate the optical fiber until a maximum polarization extinction ratio is achieved.

4. A method as set forth in claim 3, wherein the step of rotating the optical fiber further comprises communicating the polarization extinction ratio from the polarization extinction ratio meter to a digital rotation stage to continue to rotate the optical fiber until the maximum polarization extinction ratio is achieved.

5. A method as set forth in claim 1, wherein the step of determining an orientation of the birefringent elements is further defined as visually inspecting the first end of the optical fiber under magnification and against reticles for the birefringent elements.

6. A method as set forth in claim 5, wherein the step of rotating the optical fiber is further defined as rotating the optical fiber within 3 degrees of the desired orientation of the birefringent elements with a digital rotation stage.

7. A method as set forth in claim 1, further comprising the step of bonding the optical fiber into the bore of the receptacle.

8. A method as set forth in claim 7, wherein the step of bonding the optical fiber is further defined as depositing an adhesive within the bore, the receptacle, or both to secure the optical fiber therein.

9. A method as set forth in claim 8, further comprising the step of curing the adhesive after the expanded tip has been cleaved.

10. A method as set forth in claim 1, further comprising the step of terminating the second end in a v-groove block or Fiber Array Unit.

11. A method as set forth in claim 1, further comprising the step of terminating the second end in a single or multi-fiber connector such as a MTP or MPO.

12. A method as set forth in claim 1, further comprising the step of terminating the second end in a waveguide for active device termination, such as a laser diode, detector, or silicon chip.

13. A method as set forth in claim 1, further comprising the step of processing the remaining length of fiber into a flexible circuit.

14. A method as set forth in claim 1, further comprising the step of processing the remaining length of fiber into a ribbonized cable by applying acrylate or polyimide coatings.

15. A method as set forth in claim 1, wherein the step of radiating the portion of the first end with the first high energy source is further defined as controlling a laser source to emit light towards the first end of the optical fiber transverse to the optical fiber.

16. A method of manufacturing an optical fiber assembly having one or more polarization-maintaining optical fibers, each optical fiber having a core, a cladding surrounding the core, and a plurality of birefringent elements disposed within the cladding, and each optical fiber having an initial fiber diameter and extending between a first end and a second end, said method comprising the steps of:

inserting each of the first ends of the optical fibers through respective bores of a receptacle, the bores having a bore diameter larger than the initial fiber diameter;

extending the first ends of the optical fiber a distance beyond a front face of the receptacle;

simultaneously radiating a portion of the first ends of each the optical fibers that extend from the front face with a high energy source to expand the portion and form an expanded tip having an expanded diameter larger than the bore diameter of the bores;

rotating one of the optical fibers to achieve a desired orientation of the birefringent elements;

retracting the one of the optical fibers that has been rotated towards the front face to cause the expanded tip to interfere with and engage the respective bore for holding the optical fiber in the desired orientation;

continuing to rotate and retract the remaining optical fibers one at a time until all of the optical fibers have the desired orientation and are held in the respective bore;

ribbonizing at least a portion of the optical fibers that extends between the first end and the second end.

17. A method as set forth in claim 16, wherein the step of determining an orientation of the birefringent elements is further defined as transmitting a light through the optical fiber and measuring a polarization extinction ratio of the light with a polarization extinction ratio meter.

18. A method as set forth in claim 17, further comprising the step of continuing to rotate the optical fiber until a maximum polarization extinction ratio is achieved.

19. A method of manufacturing an optical fiber assembly having one or more polarization-maintaining optical fibers, each optical fiber having a core, a cladding surrounding the core, and a plurality of birefringent elements disposed within the cladding, and each optical fiber having an initial fiber diameter and extending between a first end and a second end, said method comprising the steps of:

inserting each of the first ends of the optical fibers through respective bores of a receptacle, the bores having a bore diameter larger than the initial fiber diameter;

extending the first ends of the optical fiber a distance beyond a front face of the receptacle;

simultaneously radiating a portion of the first ends of each the optical fibers that extend from the front face with a high energy source to expand the portion and form an expanded tip having an expanded diameter larger than the bore diameter of the bores;

rotating one of the optical fibers to achieve a desired orientation of the birefringent elements;

retracting the one of the optical fibers that has been rotated towards the front face to cause the expanded tip to interfere with and engage the respective bore for holding the optical fiber in the desired orientation;

continuing to rotate and retract the remaining optical fibers one at a time until all of the optical fibers have the desired orientation and are held in the respective bore;

terminating the second ends of the optical fibers in a second connector such that end-to-end polarization across the plurality of optical fibers is preserved; and removing the receptable from the first end and connectorizing each of first ends of the optical fiber.

* * * * *